(12) United States Patent
Dubrovin et al.

(10) Patent No.: US 8,583,874 B2
(45) Date of Patent: Nov. 12, 2013

(54) METHOD AND APPARATUS FOR CACHING PREFETCHED DATA

(75) Inventors: Leonid Dubrovin, Karney Shomron (IL); Alexander Rabinovitch, Kfar Yona (IL)

(73) Assignee: LSI Corporation, San Jose, CA (US)

( * ) Notice: Subject to any disclaimer, the term of this patent is extended or adjusted under 35 U.S.C. 154(b) by 458 days.

(21) Appl. No.: 12/967,155

(22) Filed: Dec. 14, 2010

(65) Prior Publication Data

US 2012/0151149 A1    Jun. 14, 2012

(51) Int. Cl.
*G06F 12/12* (2006.01)

(52) U.S. Cl.
USPC .......................................... 711/134; 711/137

(58) Field of Classification Search
USPC .................................... 711/134, 137
See application file for complete search history.

(56) References Cited

U.S. PATENT DOCUMENTS

| 2007/0043908 | A1  | 2/2007  | Diefendorff |
| 2007/0088915 | A1* | 4/2007  | Archambault et al. ....... 711/137 |
| 2009/0006762 | A1* | 1/2009  | Gara et al. ................... 711/137 |
| 2009/0106499 | A1* | 4/2009  | Aoki et al. ................... 711/137 |
| 2010/0268890 | A1* | 10/2010 | Ghai et al. ................... 711/130 |

* cited by examiner

*Primary Examiner* — Jared Rutz
(74) *Attorney, Agent, or Firm* — Otterstedt, Ellenbogen & Kammer, LLP (57) ABSTRACT

A method is provided for performing caching in a processing system including at least one data cache. The method includes the steps of: determining whether each of at least a subset of cache entries stored in the data cache comprises data that has been loaded using fetch ahead (FA); associating an identifier with each cache entry in the subset of cache entries, the identifier indicating whether the cache entry comprises data that has been loaded using FA; and implementing a cache replacement policy for controlling replacement of at least a given cache entry in the data cache with a new cache entry as a function of the identifier associated with the given cache entry.

22 Claims, 4 Drawing Sheets

METHOD AND APPARATUS FOR CACHING PREFETCHED DATA

FIELD OF THE INVENTION

The present invention relates generally to the electrical, electronic, and computer arts, and more particularly relates to improved memory caching techniques.

BACKGROUND OF THE INVENTION

In computer engineering, a cache is a block of memory used for temporary storage of frequently accessed data so that future requests for that data can be more quickly serviced. As opposed to a buffer, which is managed explicitly by a client, a cache stores data transparently; thus, a client requesting data from a system is not aware that the cache exists. The data that is stored within a cache might be comprised of results of earlier computations or duplicates of original values that are stored elsewhere. If requested data is contained in the cache, often referred to as a cache hit, this request can be served by simply reading the cache, which is comparably faster than accessing the data from main memory. Conversely, if the requested data is not contained in the cache, often referred to as a cache miss, the data is recomputed or fetched from its original storage location, which is comparably slower. Hence, the more requests that can be serviced from the cache, the faster the overall system performance.

In this manner, caching is generally used to improve processor core (i.e., core) performance in systems where data accessed by the core is located in comparatively slow and/or distant memory (e.g., double data rate 3 (DDR3) memory, etc.). A data cache is used to manage core accesses to the data information; an instruction cache is used to manage core access to instruction information. A conventional data caching strategy is to only fetch one line of data on any request from the processor core that results in a cache miss. This approach, however, causes a degradation of the application cycle count and is therefore undesirable. The cycle penalty is caused primarily by processor cycles that are spent bringing a cache line from main memory to the data cache.

A standard methodology which attempts to reduce this cycle penalty is to perform a hardware prefetch, also referred to as fetch ahead (FA), which brings a next line of data from main memory after any cache access (hit or miss). While the prefetch scheme may be helpful in reducing or even eliminating cycle penalties caused by sequential instruction execution, this approach is insufficient for non-sequential access patterns, such as, for example, a change of flow in code execution, as may be frequently encountered depending upon the particular application in which the processor is utilized.

SUMMARY OF THE INVENTION

Principles of the invention, in illustrative embodiments thereof, advantageously provide a caching methodology which ensures that lines of data brought into a cache using fetch ahead (FA) methodologies, or alternative techniques which do not cause any cache penalties, will be replaced first by a suitable cache entry replacement mechanism. In this manner, aspects of the invention beneficially improve overall performance of the cache.

In accordance with one embodiment of the invention, a method is provided for performing caching in a processing system including at least one data cache. The method includes the steps of: determining whether each of at least a subset of cache entries stored in the data cache comprises data that has been loaded using FA; associating an identifier with each cache entry in the subset of cache entries, the identifier indicating whether the cache entry comprises data that has been loaded using FA; and implementing a cache replacement policy for controlling replacement of at least a given cache entry in the data cache with a new cache entry as a function of the identifier associated with the given cache entry.

In accordance with another embodiment of the present invention, an apparatus for performing data caching includes at least one data cache and at least one processor core coupled with the data cache. The processor core is operative: (i) to determine whether each of at least a subset of cache entries stored in the data cache includes data that has been loaded using FA; (ii) to associate an identifier with each cache entry in the subset of cache entries, the identifier indicating whether the cache entry includes data that has been loaded using FA; and (iii) to implement a cache replacement policy for controlling replacement of at least a given cache entry in the data cache with a new cache entry as a function of the identifier associated with the given cache entry.

These and other features, objects and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Principles of the present invention will be described herein in the context of illustrative embodiments of a methodology and corresponding apparatus for performing data caching which involves a hardware and/or software prefetch mechanism, also referred to herein as fetch ahead (FA). It is to be appreciated, however, that the invention is not limited to the specific methods and apparatus illustratively shown and described herein. Rather, aspects of the invention are directed broadly to techniques for enhancing the overall performance of data caching in a processing system.

While illustrative embodiments of the invention will be described herein with reference to specific cache and address field formats or alternative processor architectures, etc., it is to be understood that the invention is not limited to use with these or any particular processor cache and address formats, or system architectures. Rather, principles of the invention may be extended to essentially any processor architecture, execution code, or address and cache organization. Moreover, it will become apparent to those skilled in the art given the teachings herein that numerous modifications can be made to the embodiments shown that are within the scope of the present invention. That is, no limitations with respect to the specific embodiments described herein are intended or should be inferred.

A substantial portion of the overall power consumption in a processor is attributable to memory accesses. This is related, at least in part, to switching activity on data and address buses, as well as to loading of word lines in the memories used by the processor. For at least this reason, among others (e.g., processor code execution efficiency), processor architectures that are able to implement instruction code in a manner which employs a smaller number of data memory accesses will generally exhibit better overall power performance and efficiency.

Significant power savings can be achieved by providing a storage hierarchy. For example, it is well known to employ data caches to improve processor core (i.e., core) performance in systems where data accessed by the core resides in comparatively slow and/or distant memory (e.g., DDR3 memory). One data caching approach is to perform FA, which retrieves a next line of data from main memory (or other slower memory) on any cache access (hit or miss). Improvements in processor performance using standard FA methodologies are based on the assumption that the processor core accesses data in a sequential (i.e., contiguous) manner. These assumptions, however, are not always valid for applications involving non-sequential (i.e., non-contiguous) access patterns. For example, consider a video application in which data accesses are performed two-dimensionally; likewise, consider an application involving convolution calculations, wherein two pointers move in opposite directions. In such applications where the core does not access data in a sequential manner, standard caching methodologies are generally inadequate for improving system performance. Accordingly, aspects of the invention beneficially improve processor core performance and reduce overall power consumption in the processing system, particularly in applications involving non-sequential data access patterns.

Figure 1:
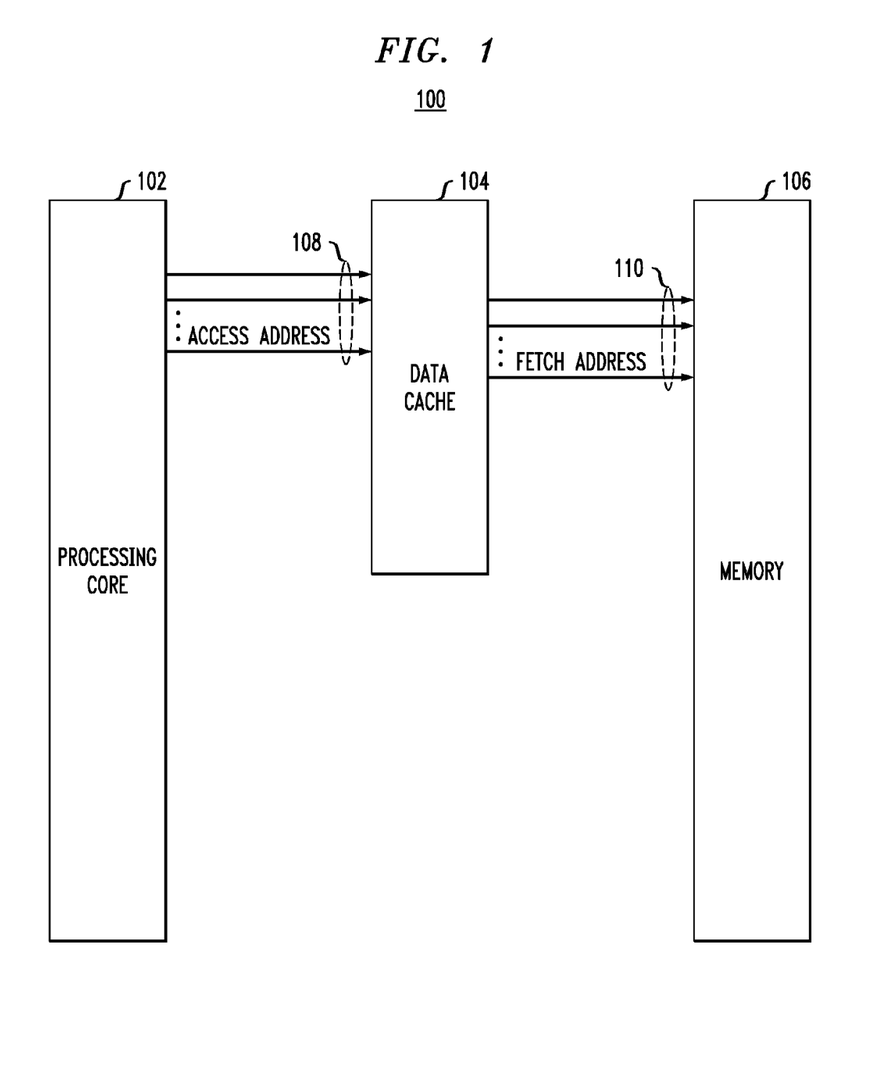
FIG. 1 is a block diagram illustrating at least a portion of an exemplary processing system is shown in which techniques of the present invention may be implemented.

As a brief overview, FIG. 1 is a block diagram illustrating at least a portion of an exemplary processing system 100 in which techniques of the present invention may be implemented. Processing system 100 includes a processing core 102, which may include, for example, a central processing unit (CPU), an arithmetic logic unit (ALU), etc., and a data cache 104 coupled with the processing core. Processing system 100 further includes main memory 106 operatively coupled with the processing core 102 via the data cache 104. Data cache 104 is comprised of memory that is separate from the processing core's main memory 106. Processor core 102, cache 104 and main memory 106 may be collocated within a single integrated circuit (e.g., as may be the case with a system-on-a-chip (SoC)), or one or more of the processor core, cache and memory may be separate from, but communicatively coupled with, the other components. Additionally, the present invention, according to embodiments thereof, is applicable to multi-level cache schemes where the main memory acts as a cache for an additional main memory (e.g., level-1 (L1) cache in static random access memory (SRAM), level-2 (L2) cache in dynamic random access memory (DRAM), and level-3 (L3) cache in a hard disk drive).

Data cache 104 is preferably considerably smaller, but faster in comparison to the main memory 106, although the invention is not limited to any particular size and/or speed of either the data cache or main memory. Data cache 104 essentially contains a duplicate of a subset of certain data stored in main memory 106. The subset of data is ideally data frequently accessed by the processing core 102. Each of the storage locations in data cache 104 may be mapped to a corresponding location in main memory 106 using one or more of various known cache mapping techniques, such as, for example, direct mapping, fully associative mapping, set associative mapping, etc. It is to be understood that the invention is not limited to any specific cache mapping scheme(s).

More particularly, a cache's associativity determines how many main memory locations map into respective cache memory locations. A cache is said to be fully associative if its architecture allows any main memory location to map into any location in the cache. A cache may also be organized using a set-associative architecture. A set-associative cache architecture is a hybrid between a direct-mapped architecture and a fully-associative architecture, where each address is mapped to a certain set of cache locations. To accomplish this, the cache memory address space is divided into blocks of $2^m$ bytes (the cache line size), discarding the least significant (i.e., bottom) m address bits, where m is an integer. An n-way set associative cache with S sets includes n cache locations in each set, where n is an integer. A given block B is mapped to set {B mod S} (where "mod" represents a modulo operation) and may be stored in any of the n locations in that set with its upper address bits as a tag, or alternative identifier. To determine whether block B is in the cache, set {B mod S} is searched associatively for the tag. A direct-mapped cache may be considered "one-way set associative" (i.e., one location in each set), whereas a fully associative cache may be considered "N-way set associative," where N is the total number of blocks in the cache.

When the processing core 102 requires certain data, either in performing arithmetic operations, branch control, etc., an address (memory access address) 108 for accessing a desired memory location or locations is sent to data cache 104. If the requested data is contained in data cache 104, referred to as a cache hit, this request is served by simply reading the cache data at the supplied memory address 108. Alternatively, when the requested data is not contained in data cache 104, referred to as a cache miss, a fetch address 110, which is indicative of the memory access address 108, is sent to main memory 106 where the data is then fetched into cache 104 from its original storage location in the main memory and also supplied to the processing core 102. Data buses, or alternative connection means, used to transfer data between the processor and the data cache, and between the data cache to main memory are not shown in FIG. 1 for clarity purposes, although such bus connections are implied, as will be known by the skilled artisan. On a practical level, since data cache 104 cannot hold the same amount of data as main memory 106, the cache mapping scheme controls how data is transferred between the data cache and main memory.

Figure 2A:
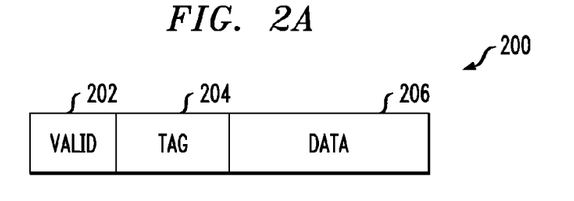
FIG. 2A is a conceptual view depicting an illustrative organization of a cache block (i.e., cache line) in an exemplary data cache structure.

A data cache can be easily visualized as an array of elements. These elements may be referred to as "cache blocks"

or "cache lines" (i.e., cache row entries). With reference now to FIG. 2A, an illustrative cache line 200 in an exemplary data cache structure is shown. Each cache line 200 is preferably organized into a plurality of fields, each field comprising a subset of the total number of storage bits in a given cache row entry. By way of example only and without limitation, cache line 200 includes a valid field 202 comprising one or more bits (e.g., a dirty bit) indicating whether the data in this cache line is valid, a tag field 204 comprising one or more significant bits of a memory address corresponding to data stored in a data field 206 of the cache line; the data field 206 stores the actual data fetched from main memory. It is to be understood that the invention is not limited to any specific arrangement of the cache line 200.

Figure 2B:
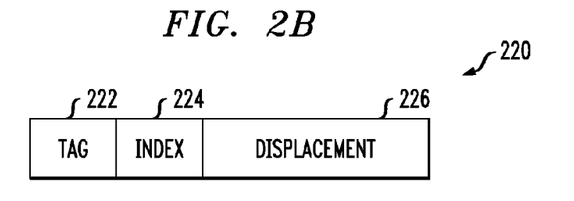
FIG. 2B is an illustrative arrangement for a requested memory address generated by a processor in the context of a direct mapping address structure.

When the processor requests to read or write a location in main memory, it first checks whether the requested memory location is in the cache. This may be accomplished by comparing the address of the memory location to tags in the cache that might contain that address. A cache hit is indicative of the processor finding the requested memory location in the cache; otherwise, a cache miss has occurred. An effective memory address generated by the processor may utilize an arrangement as shown in FIG. 2B, at least in the context of a direct mapping address structure. Specifically, the requested memory address 220 may be organized into a plurality of fields, including a tag field 222, an index field 224, and a displacement (i.e., offset) field 226. In a direct mapping cache scenario, the lower $\log_2$(cache line size) bits of the address 220 preferably form the displacement field 226 that defines which byte is in the block, the next $\log_2$(number of cache lines) bits of the address form the index field 224 defining which line of the cache is being referenced, and the remaining most significant bits (MSB) of the address form the tag field. It is to be appreciated that the invention is not limited to any specific arrangement of the address 220; rather, alternative organizations of bits forming a given memory address are similarly contemplated and may vary as a function of the type of cache mapping scheme employed.

Figure 2C:
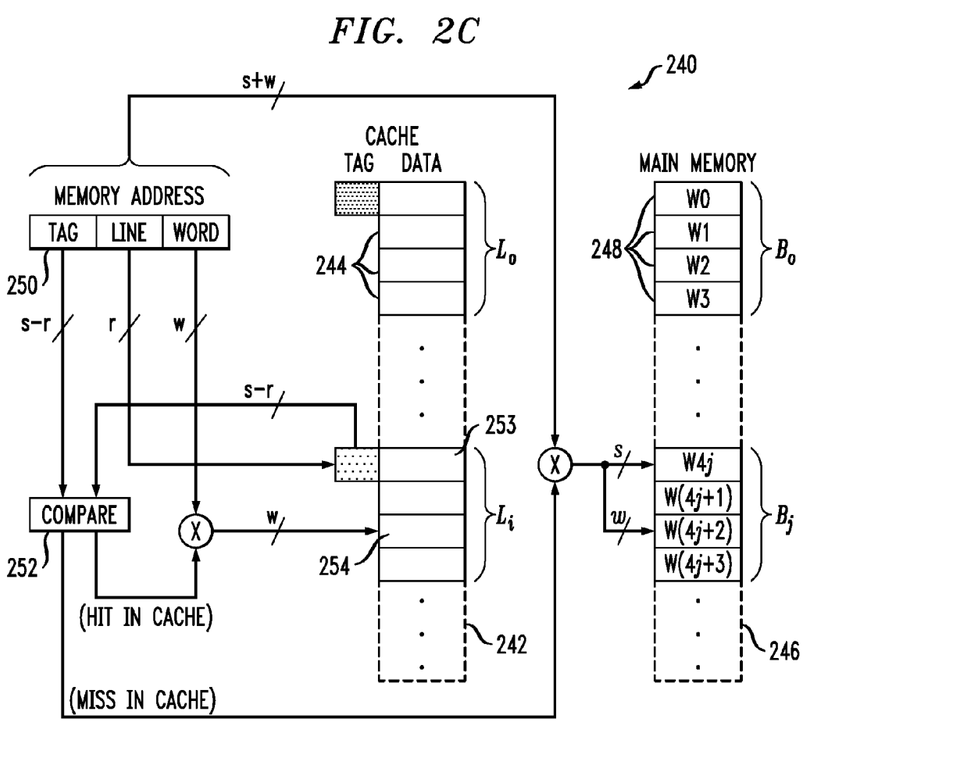
FIG. 2C is a conceptual view depicting an exemplary direct mapping cache system in which techniques of the invention may be implemented.

FIG. 2C is a conceptual view depicting an exemplary direct mapping cache system 240 in which techniques of the invention may be implemented. Cache system 240 includes a data cache 242 comprising a plurality of cache blocks (i.e., cache lines) 244, 253 and 254, and main memory 246 comprising a plurality of memory locations 248. More than one memory location may be used to form a block of data in the main memory 246. For example, a first data block, $B_0$, in main memory 246 may include four data words (W0, W1, W2 and W3); a j-th data block, $B_j$, may include four data words (W4j, W(4j+1), W(4j+2) and W(4j+3)), where j is an integer. It is to be understood that the invention is not limited to any specific number of words in a given data block.

A memory address 250 is generated by a processor core when a memory access (e.g., read or write) is requested. The memory address includes a tag field, a line field and a word field, which corresponds to tag field 222, index field 224 and displacement field 226, respectively, in the address 220 shown in FIG. 2B. The memory address 250 comprises s+w bits, where s is an integer representing a first portion of the memory address which points to a starting location of a selected data block in the main memory 246 and w is an integer representing a second portion of the memory address which is indicative of an offset from the given starting location of the selected data block. The word field comprises the w least significant bits (LSB) of the address 250, where w represents the offset from a cache line number identified by the memory address, the line field comprises the next higher r bits of the memory address identifying the cache line number that a particular block maps to, and the tag field comprises the remaining s-r most significant bits of the memory address which distinguishes cache blocks that map to the same cache line (e.g., $2^{(s-r)}$ blocks map to the same cache line).

When a memory access is requested by the processor, the tag field of the requested memory address 250 is compared to the tag field of a cache line 253 identified by the line field in the memory address, for example using a comparator 252 or alternative comparison means. If the two tag fields match, a cache hit is said to occur, at which point data is accessed in a given cache line 254 in a block ($L_i$) of cache lines beginning with the identified cache line 253 and offset by the word field in the memory address 250. When the two tag fields do not match, a cache miss is said to occur indicating that the requested access location does not reside in the cache 242, at which point access is redirected to a location in main memory 246 identified by memory address 250.

In a processor architecture, hardware and/or software prefetching (i.e., FA) is a technique used to speed up the execution of a program by reducing wait states (e.g., a delay experienced by a processor when accessing external memory or another device that is slow to respond). Prefetching occurs when a processor requests data from main memory before it is actually needed. Once the data is retrieved from memory, it is stored in the cache. For sequentially-executed programs, data may be prefetched in program order. However, for non-sequentially-executed programs, a processor preferably controls the FA as a function of an anticipated result of a calculation or other operation and fetches data in advance based on this expected result. To accomplish this, the processing system may comprise a FA circuit, or alternative controller, operative to generate control signals for prefetching the correct data.

When a cache miss occurs, a block of data which includes the data requested by the processor is fetched from main memory and stored somewhere in the data cache. If the cache is not already full, the data is simply stored in the next available memory location in the cache. However, the decision as to which location in the cache to store the fetched blocks of data becomes more complex when the data cache has no available unused storage locations. In this case, a cache replacement policy is generally implemented to determine which data in the cache is to be discarded and replaced by the newly retrieved data. A cache replacement policy, also referred to as a replacement algorithm or cache algorithm, is a set of optimizing instructions executed by a processor and/or a hardware-maintained structure that controls information storage in a cache. When the cache is full, the replacement policy is tasked with choosing which data to discard to make room for newly retrieved data.

There are various known cache replacement policies all of which essentially seek to optimize the replacement of cache data so that data most likely to be immediately used is retained and data that is least likely to be immediately used is replaced. Perhaps the most efficient caching algorithm would be to always discard information that will not be needed for the longest time in the future. This optimal objective is often referred to as Belady's algorithm or the clairvoyant algorithm. Unfortunately, however, it is generally impossible to predict how far in the future data will be needed, and thus Belady's algorithm is generally not implementable in practice. Embodiments of the invention will be described herein in the context of a least recently used (LRU) cache replacement policy (i.e., algorithm), although it is to be appreciated that alternative replacement methodologies may be similarly employed, including, but not limited to, first-in-first-out (FIFO), least frequently used (LFU), pseudo-LRU (PLRU), most recently used (MRU), and random replacement caching algorithms.

As the name suggests, an LRU cache replacement policy discards least recently used data first. To accomplish this, the LRU algorithm is preferably operative to keep track of when data is used, such as, for example, by monitoring "age bits" corresponding to the respective cache lines and tracking the least recently cache line based on a status of the corresponding age bits. In such an implementation, each time a cache line is accessed, the age bits of all the other cache lines are updated (e.g., by incrementing a counter or an alternative tracking means). When newly fetched data needs to be stored in the cache, the cache line(s) least recently accessed are replaced first.

In accordance with an important aspect of the invention, cache entries loaded into a data cache using a hardware or software prefetch (i.e., FA) are distinguished from data loaded into the cache through other means. A cache replacement policy implemented by the processing system is operative to treat FA cache entries differently. One benefit of this approach is a significant reduction in cache pollution attributable to entries loaded using FA, thus increasing the probability of keeping entries made by non-sequential accesses, thereby achieving an improvement in overall performance of the cache. The term "cache pollution" as used herein is broadly intended to refer to situations in which data is loaded into a cache unnecessarily, thus causing other needed data to be discarded from the cache into lower levels of the processor memory hierarchy (potentially all the way down to main memory), thereby resulting in a substantial performance degradation. In this manner, methodologies of the invention beneficially ensure that lines of data loaded into a cache using FA techniques, or an alternative methodology which does not cause any cache penalty, will be first to be replaced by other data cache entries.

According to an embodiment of the invention, cache entries generated using FA are marked, such as, for instance, by setting one or more dedicated bits in a prescribed field of the cache line (e.g., tag field), or by an alternative identification mechanism (e.g., appending a new field to the cache line). By way of example only and without loss of generality, an FA_entry bit is preferably included in a tag field (e.g., tag field 222 in FIG. 2B) in each of at least a subset of the cache lines in a data cache structure. In one embodiment the FA_entry bit for a given cache line is set to a logical "1" (e.g., asserted, logic "high," VDD, etc.) when an FA circuit, or alternative prefetching means, was used to fetch the data stored in the given cache line from memory; in all other cases, the FA_entry bit is set to a logical "0" (e.g., deasserted, logic "low," ground, VSS, etc.).

Figure 3:
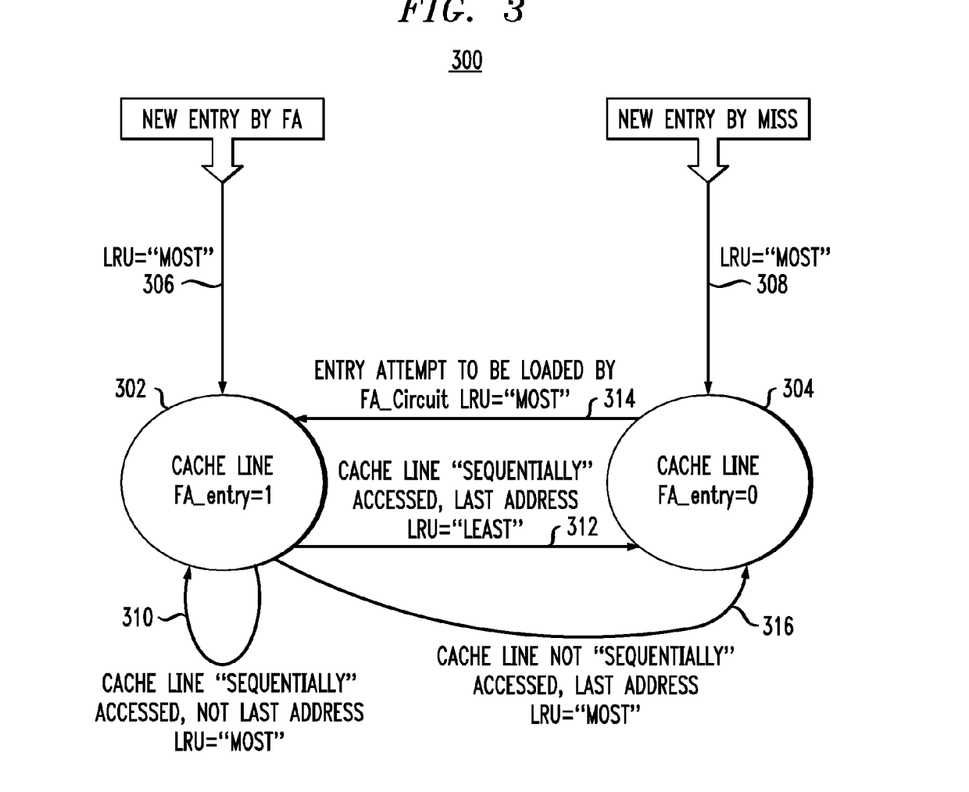
FIG. 3 is a state transition diagram depicting an exemplary methodology for identifying data stored in a cache using fetch ahead, according to an embodiment of the invention.

FIG. 3 is a state transition diagram 300 depicting at least a portion of an exemplary methodology for identifying data stored in a cache using FA, according to an embodiment of the invention. Although the methodology shown in the state transition diagram 300 assumes that a LRU cache replacement policy is employed, the invention is not limited to use with such a cache replacement policy. Rather, alternative cache replacement methodologies, including those previously mentioned, are similarly contemplated, either with or without modification to the state transition diagram 300. At least one state machine or alternative controller in a processing system including a cache, or residing in the cache itself, may be utilized to implement at least a portion of the exemplary methodology represented by state transition diagram 300.

State transition diagram 300 includes a first state 302 and a second state 304. Upon receipt of a new cache entry by FA, a state of the LRU cache replacement policy is set to "most," indicating that the entry is most recently used and will therefore be the last candidate for replacement by a new cache entry. The method then transitions into the first state 302, as indicated by state transition path 306, where the FA_entry bit is set to a logic "1" to indicate that the new cache entry was the result of a hardware or software prefetch (i.e., FA). Upon receipt of a new cache entry by another (i.e., non-FA) means, such as, for example, when a cache miss occurs, the state of the LRU cache replacement policy is again set to "most" and the method transitions into the second state 304, as indicated by state transition path 308, where the FA_entry bit is set to a logic "0" to indicate that the new cache entry was not a result of a FA.

A "sequentially accessed cache line" as the term is used herein is broadly intended to refer to a line in the data cache wherein all of its data is accessed in sequential order. Detecting whether access to a given cache entry is sequential or non-sequential may be performed, for example, by comparing a current access address with an access address adjacent to (e.g., immediately preceding or immediately succeeding) the current access address, such as by employing a comparator or other comparison circuitry in the data cache. When adjacent memory access addresses are consecutive in number, the memory accesses may be considered sequential.

When a cache line is accessed sequentially, the state of the LRU cache replacement policy is updated according to whether the cache line was brought into the data cache by a hardware or software prefetch, as indicated by the logical state of the FA_entry bit. For a sequentially accessed cache line in state 302 (i.e., loaded by FA; FA_entry=1) wherein the requested address is not the last address in the cache block, control remains in state 302 (as indicated by state transition path 310) and the state of the LRU cache replacement policy is set to "most," indicating that the entry is most recently used and will therefore be the last candidate for replacement by a new cache entry. For a sequentially accessed cache line in state 302 wherein the accessed cache line corresponds to the last address in the cache block, control transitions to state 304 (FA_entry=0), as indicated by state transition path 312, and the state of the LRU cache replacement policy is set to "least," indicating that the entry is least recently used and will therefore be the first candidate for replacement by a new cache entry. The assumption is that if a cache line that has been loaded by FA is accessed sequentially and the processor accesses (e.g., by a read or write operation) the last byte of the cache line, then the line is no longer required and can therefore be discarded from the cache.

When the FA_entry bit is set to "0" in state 304, indicating that the cache entry was not loaded as a result of a hardware or software prefetch (e.g., a cache miss), the state of the LRU cache replacement policy is changed to "most." When the cache entry is attempted to be loaded by the FA circuit, control transitions to state 302, thereby setting the FA_entry bit to 1 and changing the state of the LRU cache replacement policy to "most," as indicated by state transition path 314. This is the only way to transition from state 304 to state 302 according to the exemplary state transition diagram 300. In either case, the FA_entry bit is set to "0" after the cache entry access. The LRU priorities for all other entries are preferably changed according to the LRU algorithm.

A "non-sequentially accessed cache line" as the term is used herein is broadly intended to refer to a line in the cache wherein all of its data is not accessed in sequential order. Any non-sequential access to a cache entry marked with FA_entry=1, causes the FA_entry bit to be changed to 0 and the state of the LRU cache replacement policy for the entry is changed to "most," as indicated by state transition path 316. The LRU priorities for all other entries are preferably changed according to the LRU algorithm.

For a hit or miss on cache entries with the FA_entry bit set to "0," the state of the LRU cache replacement policy is changed to "most." The LRU priorities for all other entries are changed according to the LRU algorithm.

Figure 4:
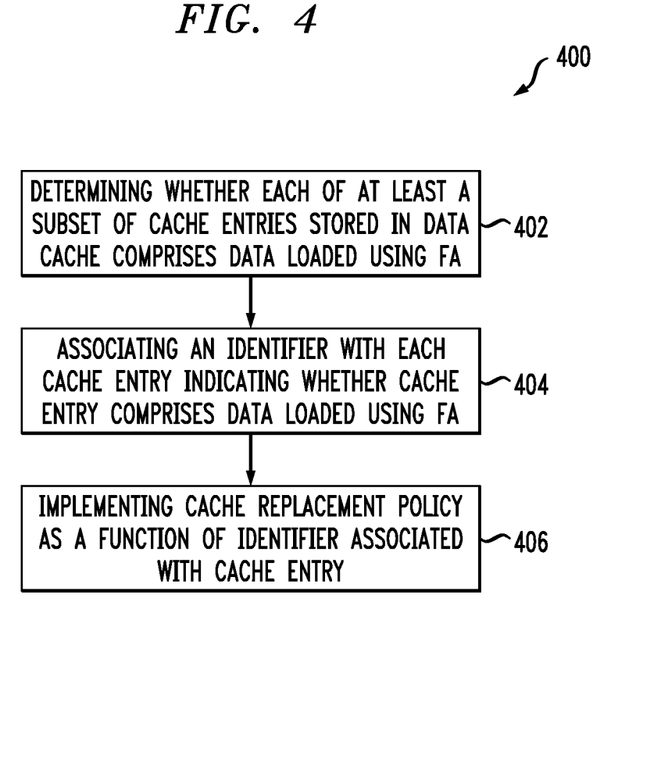
FIG. 4 depicts an exemplary caching methodology for handling data that has been loaded using FA techniques, according to an embodiment of the invention.

With reference now to FIG. 4, an exemplary caching methodology 400 for managing the storage of data that has been loaded using FA techniques, according to an embodiment of the invention. Method 400, in step 402, is operative to determine which of at least a subset of the plurality of cache entries in the data cache structure has been loaded using a hardware and/or software prefetch (i.e., FA). As previously stated, this may be accomplished using information generated by a FA circuit in the processing system, or by alternative means (e.g., the processor core may be operative to track information regarding which cache entries include prefetched data).

In step 404, each cache entry containing data that has been loaded by FA is marked (i.e., associated) with an identifier. The identifier preferably comprises one or more bits of a field in the cache entry (e.g., tag field). The invention similarly contemplates using alternative methodologies for tracking cache entries containing data loaded by FA, such as, for example, by generating a table or other structure operative to store such information and its associated cache entry. As previously described in conjunction with FIG. 3, the identifier associated with the cache entries is then utilized by a suitable cache replacement policy (e.g., hardware- or software-implemented), which may be a LRU replacement method, for controlling which cache entries to discard to make space for a new cache entry in the data cache. In this manner, techniques of the invention advantageously reduce cache pollution resulting from cache entries loaded by FA.

Figure 5:
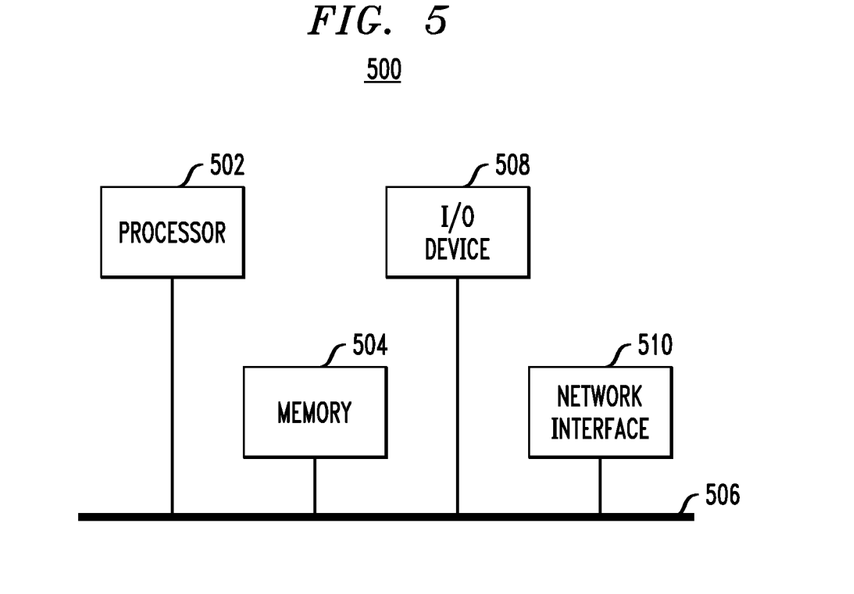
FIG. 5 is a block diagram depicting an exemplary processing system in which aspects of the present invention can be implemented, according to an embodiment of the invention.

Methodologies of embodiments of the present invention may be particularly well-suited for implementation in an electronic device or alternative system, such as, for example, a microprocessor or other processing device/system. By way of illustration only, FIG. 5 is a block diagram depicting an exemplary data processing system 500, formed in accordance with an aspect of the invention. System 500 may represent, for example, a general purpose computer or other computing device or systems of computing devices. System 500 may include a processor 502, memory 504 coupled with the processor, as well as input/output (I/O) circuitry 508 operative to interface with the processor. The processor 502, memory 504, and I/O circuitry 508 can be interconnected, for example, via a bus 506, or alternative connection means, as part of data processing system 500. Suitable interconnections, for example via the bus, can also be provided to a network interface 510, such as a network interface card (NIC), which can be provided to interface with a computer or Internet Protocol (IP) network, and to a media interface, such as a diskette or CD-ROM drive, which can be provided to interface with media. The processor 502 may be configured to perform at least a portion of the methodologies of the present invention described herein above.

It is to be appreciated that the term "processor" as used herein is intended to include any processing device, such as, for example, one that includes a central processing unit (CPU) and/or other processing circuitry (e.g., network processor, DSP, microprocessor, etc.). Additionally, it is to be understood that the term "processor" may refer to more than one processing device, and that various elements associated with a processing device may be shared by other processing devices. The term "memory" as used herein is intended to include memory (e.g., cache memory, main memory, etc.) and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, one or more output devices (e.g., printer, monitor, etc.) for presenting the results associated with the processor, and/or interface circuitry for operatively coupling the input or output device(s) to the processor.

Accordingly, an application program, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 502. In any case, it is to be appreciated that at least a portion of the components and/or methods shown in any of FIGS. 1 through 4 may be implemented in various forms of hardware, software, or combinations thereof, e.g., one or more processor cores with associated cache, application-specific integrated circuit(s), functional circuitry, one or more operatively programmed general purpose digital computers with associated memory, etc. Given the teachings of the invention provided herein, one of ordinary skill in the art will be able to contemplate other implementations of the components of the invention.

At least a portion of the techniques of the present invention may be implemented in one or more integrated circuits. In forming integrated circuits, die are typically fabricated in a repeated pattern on a surface of a semiconductor wafer. Each of the die includes a memory described herein, and may include other structures or circuits. Individual die are cut or diced from the wafer, then packaged as integrated circuits. One skilled in the art would know how to dice wafers and package die to produce integrated circuits. Integrated circuits so manufactured are considered part of this invention.

An IC in accordance with embodiments of the present invention can be employed in any application and/or electronic system which is adapted for performing multiple-operand logical calculations in a single instruction. Suitable systems for implementing embodiments of the invention may include, but are not limited to, personal computers, portable computing devices (e.g., personal digital assistants (PDAs)), multimedia processing devices, etc. Systems incorporating such integrated circuits are considered part of this invention. Given the teachings of the invention provided herein, one of ordinary skill in the art will be able to contemplate other implementations and applications of the techniques of the invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method for performing caching in a processing system including at least one data cache, the method comprising the steps of:

determining whether each of at least a subset of cache entries stored in the data cache comprises data that has been loaded using fetch ahead;

associating an identifier with each cache entry in the subset of cache entries, the identifier indicating whether the cache entry comprises data that has been loaded using fetch ahead;

implementing a cache replacement policy for controlling replacement of at least a given cache entry in the data cache with a new cache entry as a function of the identifier associated with the given cache entry;

detecting whether access to a given cache entry is sequential or non-sequential;

when the given cache entry is sequentially accessed, updating a state of the cache replacement policy as a function of the identifier associated with the given cache entry; and when the given cache entry is non-sequentially accessed, changing a state of the identifier associated with the given cache entry to indicate that the data in the given cache entry has not been loaded using fetch ahead.

2. The method of claim 1, wherein the step of associating an identifier with each cache entry in the subset of cache entries comprises setting at least one bit in a field of the cache entry.

3. The method of claim 2, wherein the field of the cache entry comprises at least a portion of a tag field.

4. The method of claim 1, wherein the step of determining whether each of at least the subset of cache entries stored in the data cache comprises data that has been loaded using fetch ahead comprises retrieving information generated by fetch ahead circuitry in the processing system.

5. The method of claim 1, wherein the step of implementing a cache replacement policy comprises utilizing a least recently used cache replacement methodology, a decision as to which of the plurality of cache entries to replace upon receipt of a new cache entry being based at least in part on the identifier associated with the given cache entry.

6. The method of claim 1, wherein the step of detecting whether access to the given cache entry is sequential or non-sequential comprises comparing a current access address with an access address that is one of immediately preceding and immediately succeeding the current access address.

7. The method of claim 1, further comprising configuring each cache entry in the subset of cache entries so as to include at least one bit operative to track a manner in which data is loaded into the subset of cache entries, wherein the step of associating an identifier with each cache entry in the subset of cache entries comprises setting a logical state of the at least one bit as a function of the manner in which data is loaded into the cache entry.

8. A method for performing caching in a processing system including at least one data cache, the method comprising the steps of:

determining whether each of at least a subset of cache entries stored in the data cache comprises data that has been loaded using fetch ahead;

associating an identifier with each cache entry in the subset of cache entries, the identifier indicating whether the cache entry comprises data that has been loaded using fetch ahead;

implementing a cache replacement policy for controlling replacement of at least a given cache entry in the data cache with a new cache entry as a function of the identifier associated with the given cache entry;

determining whether access to a given cache entry in the data cache corresponds to a last address in the given cache entry; and performing at least one of updating a state of the identifier associated with the given cache entry and updating a state of the cache replacement policy as a function of whether access to the given cache entry corresponds to the last address in the given cache entry.

9. The method of claim 8, wherein the step of updating the state of the identifier associated with the given cache entry comprises changing a state of the identifier to indicate that the data in the given cache entry has not been loaded using fetch ahead when access to the given cache entry corresponds to the last address in the given cache entry.

10. The method of claim 8, further comprising:

detecting whether access to a given cache entry is sequential or non-sequential;

wherein the step of updating the state of the identifier associated with the given cache entry comprises maintaining a state of the identifier to indicate that the data in the given cache entry has been loaded using fetch ahead when: (i) data corresponding to the given cache entry was loaded using fetch ahead; (ii) access to the given cache entry does not correspond to the last address in the given cache entry; and (ii) the given cache entry is sequentially accessed.

11. The method of claim 8, further comprising:

detecting whether access to a given cache entry is sequential or non-sequential; and configuring the cache replacement policy to discard the given cache entry when: (i) data corresponding to the given cache entry was loaded using fetch ahead; (ii) access to the given cache entry corresponds to the last address in the given cache entry; and (iii) the given cache entry is sequentially accessed.

12. The method of claim 8, further comprising:

detecting whether access to a given cache entry is sequential or non-sequential; and configuring the cache replacement policy to retain the given cache entry when data corresponding to the given cache entry was loaded using fetch ahead and one of: (i) access to the given cache entry does not correspond to the last address in the given cache entry and the given cache entry is sequentially accessed; and (ii) access to the given cache entry corresponds to the last address in the given cache entry and the given cache entry is non-sequentially accessed.

13. An apparatus for performing data caching, comprising:

at least one data cache;

at least one processor core coupled with the data cache and operative: (i) to determine whether each of at least a subset of cache entries stored in the data cache comprises data that has been loaded using fetch ahead; (ii) to associate an identifier with each cache entry in the subset of cache entries, the identifier indicating whether the cache entry comprises data that has been loaded using fetch ahead; and (iii) to implement a cache replacement policy for controlling replacement of at least a given cache entry in the data cache with a new cache entry as a function of the identifier associated with the given cache entry; and detection circuitry operatively coupled with the at least one processor core and operative to detect whether access to a given cache entry is sequential or non-sequential, wherein when the given cache entry is sequentially accessed, the processor core is operative to update a state of the cache replacement policy as a function of the identifier associated with the given cache entry, and when the given cache entry is non-sequentially accessed, the processor is operative to change a state of the identifier to indicate that the data in the given cache entry has not been loaded using fetch ahead.

14. The apparatus of claim 13, further comprising fetch ahead circuitry operative to prefetch data and to store the data in the data cache.

15. The apparatus of claim 13, wherein the identifier associated with each cache entry in the subset of cache entries comprises at least one bit in a field of the cache entry.

16. The apparatus of claim 13, wherein the cache replacement policy implemented by the at least one processor core comprises a least recently used cache replacement methodology, a decision as to which of the plurality of cache entries in the at least one data cache to replace upon receipt of a new cache entry being based at least in part on the identifier associated with the given cache entry.

17. The apparatus of claim 13, wherein the detection circuitry comprises at least one comparator operative to compare a current access address with an access address that is one of immediately preceding and immediately succeeding the current access address to thereby determine whether access to the given cache entry is sequential or non-sequential.

18. The apparatus of claim 13, wherein the at least one processor core comprises at least one state machine.

19. The apparatus of claim 13, wherein the at least one data cache and the at least one processor core are collocated on a same integrated circuit chip.

20. An apparatus for performing data caching, comprising:
at least one data cache;
at least one processor core coupled with the data cache and operative: (i) to determine whether each of at least a subset of cache entries stored in the data cache comprises data that has been loaded using fetch ahead; (ii) to associate an identifier with each cache entry in the subset of cache entries, the identifier indicating whether the cache entry comprises data that has been loaded using fetch ahead; and (iii) to implement a cache replacement policy for controlling replacement of at least a given cache entry in the data cache with a new cache entry as a function of the identifier associated with the given cache entry; and
at least one comparator coupled with the at least one processor core and operative to determine whether access to a given cache entry in the data cache corresponds to a last address in the given cache entry, wherein the processor, as a function of whether access to the given cache entry corresponds to the last address in the given cache entry, is operative to at least one of:
1) update a state of the identifier associated with the given cache entry and
2) update a state of the cache replacement policy.

21. An apparatus for performing data caching, comprising:
at least one data cache; and
at least one processor core coupled with the data cache and operative: (i) to determine whether each of at least a subset of cache entries stored in the data cache comprises data that has been loaded using fetch ahead; (ii) to associate an identifier with each cache entry in the subset of cache entries, the identifier indicating whether the cache entry comprises data that has been loaded using fetch ahead; and (iii) to implement a cache replacement policy for controlling replacement of at least a given cache entry in the data cache with a new cache entry as a function of the identifier associated with the given cache entry;
wherein the at least one processor core comprises at least one state machine, the at least one state machine comprising:
a first state in which the identifier associated with a given cache entry indicates that the given cache entry comprises data that has been loaded using fetch ahead; and
a second state in which the identifier associated with the given cache entry indicates that the given cache entry comprises data that has been loaded using fetch ahead;
wherein the at least one state machine is operative to enter the first state when: (i) the state machine is in the second state and a fetch ahead of the given cache entry is initiated by the processor core; and (ii) the state machine is in the first state, the given cache entry is sequentially accessed, and access to the given cache entry does not correspond to the last address in the given cache entry; and
wherein the at least one state machine is operative to enter the second state when the state machine is in the first state and access to the given cache entry corresponds to the last address in the given cache entry.

22. An integrated circuit, comprising:
at least one data cache;
at least one processor core coupled with the data cache and operative: (i) to determine whether each of at least a subset of cache entries stored in the data cache comprises data that has been loaded using fetch ahead; (ii) to associate an identifier with each cache entry in the subset of cache entries, the identifier indicating whether the cache entry comprises data that has been loaded using fetch ahead; and (iii) to implement a cache replacement policy for controlling replacement of at least a given cache entry in the data cache with a new cache entry as a function of the identifier associated with the given cache entry; and
detection circuitry operatively coupled with the at least one processor core and operative to detect whether access to a given cache entry is sequential or non-sequential, wherein when the given cache entry is sequentially accessed, the processor core is operative to update a state of the cache replacement policy as a function of the identifier associated with the given cache entry, and when the given cache entry is non-sequentially accessed, the processor is operative to change a state of the identifier to indicate that the data in the given cache entry has not been loaded using fetch ahead.

* * * * *